(12) United States Patent
Barton et al.

(10) Patent No.: US 6,212,966 B1
(45) Date of Patent: Apr. 10, 2001

(54) CONTROL SYSTEM FOR A POWER SHUTTLE GEARBOX

(75) Inventors: John Robert Barton, Nr Coventry; Sion Morgan Owen, Lutterworth, both of (GB)

(73) Assignee: AGCO Limited (GB)

( * ) Notice: Subject to any disclaimer, the term of this patent is extended or adjusted under 35 U.S.C. 154(b) by 0 days.

(21) Appl. No.: 09/467,661

(22) Filed: Dec. 20, 1999

(30) Foreign Application Priority Data

Dec. 23, 1998 (GB) .................................................. 9828412

(51) Int. Cl.$^7$ ........................... F16H 59/00; F16H 61/00; F16H 63/00
(52) U.S. Cl. .......................... 74/335; 192/3.55; 74/336 R
(58) Field of Search .................................. 74/335, 336 R; 477/63, 68; 701/51, 56, 55; 192/3.55

(56) References Cited

U.S. PATENT DOCUMENTS

| 5,012,416 | 4/1991 | Bulgrien et al. ................... 364/424.1 |
| 5,053,960 | * 10/1991 | Brekkestran et al. ............ 364/424.1 |
| 5,459,658 | * 10/1995 | Morey et al. ...................... 364/424.1 |
| 5,608,917 | 3/1997 | Landis et al. ............................. 2/418 |
| 5,609,068 | 3/1997 | Gruhle et al. ...................... 74/336 R |
| 5,845,224 | * 12/1998 | McKee .................................. 701/51 |
| 5,996,435 | 12/1999 | Riedhammer ...................... 74/336 R |

FOREIGN PATENT DOCUMENTS 2315826    2/1998    (GB).

* cited by examiner

*Primary Examiner*—Sherry Estremsky
*Assistant Examiner*—Tisha D. Lewis
(74) *Attorney, Agent, or Firm*—MacMillan, Sobanski & Todd, LLC

(57) ABSTRACT

In a control system for a power shuttle transmission, the transmission comprises a first clutch pack engagement of which drives a transmission output in a first direction, and a second clutch pack engagement of which drives the transmission output in a second direction, and means to engage and disengage the first and/or second clutch pack, the control system comprising control means to initiate and complete engagement and/or disengagement cycles of the first and/or second clutch pack, and wherein the control system comprises adjustment means for actuation by an operator of the transmission to adjust the said engagement/disengagement cycle.

13 Claims, 4 Drawing Sheets

CONTROL SYSTEM FOR A POWER SHUTTLE GEARBOX

FIELD OF THE INVENTION

This invention relates to a control system for a power shuttle transmission.

BACKGROUND TO THE INVENTION

Tractors are often used in applications, for example loading work or cultivation work, where frequent changes between forward and reverse gears are required. To avoid repeated de-clutching the power shuttle gearbox was developed.

The power shuttle gearbox allows the driver of a vehicle, for example an agricultural tractor, to change the direction of travel from forward to reverse or vice versa simply by pressing a button or pulling a lever. It is not necessary for the driver to use the clutch pedal at all to initiate a change of direction gear change. Some power shuttle gearboxes also allow gearshifts from neutral to a forward gear, or neutral to a reverse gear to be executed.

One type of power shuttle gearbox requires the hydraulic actuation of the clutch. The performance of such a power shuttle gearbox is influenced by the time taken for the hydraulic actuator to move the clutch pack from its biting point to it fully engaged positions. This is known as clutch take up. Changing the duration of this period changes the aggressiveness of clutch take up, and therefore the aggressiveness with which drive is taken up.

Tractors generally have a plurality of gears and gear ranges. For example, a transmission may comprise a four-speed gearbox coupled to a three-speed range change, thereby giving twelve gear ratios. The provision of a power shuttle gives the transmission twelve forward and twelve reverse gear ratios.

It is known to program the power shuttle so that for each gear ratio the time taken for the clutch take up differs. Whilst this may provide a smooth transition during shuttling, a smooth transition is not always required.

One problem associated with the above-mentioned type of power shuttle is that a tractor may be required to do two different jobs using the same gear ratio, but the jobs may have different requirements for aggressiveness of clutch take up.

Another problem associated with the above-mentioned type of power shuttle is that different drivers have different personal requirements from a tractor. Whilst one driver may not mind aggressive clutch take up, another my find this uncomfortable.

It would therefore be desirable to provide a control system for a power shuttle gearbox which does not suffer from the problems associated with the above-mentioned prior art.

SUMMARY OF THE INVENTION

The invention provides a control system for a power shuttle transmission, the transmission comprising a first clutch pack engagement of which drives a transmission output in a first direction, and a second clutch pack engagement of which drives the transmission output in a second direction, and means to engage and disengage the first and/or second clutch pack, wherein the control system comprises control means to initiate and complete engagement and/or disengagement cycles of the first and/or second clutch pack, and wherein the control system comprises adjustment means for actuation by an operator of the transmission to adjust the said engagement/disengagement cycle.

Preferably, the control means comprises a gear sensor means to sense an engaged gear ratio in the transmission. The transmission may comprise a plurality of gear sets each comprising a plurality of engageable gear ratios. The gear sensor means may be arranged to sense the engaged gear ratio in one of the said gear sets. Alternatively, the gear sensor means may be arranged to sense the engaged gear ratio in more than one of the plurality of gear sets.

Preferably, the control means is programmed with a plurality of different program cycles for initiating and completing engagement/disengagement cycles of the clutch packs.

Advantageously, the control means comprises a shuttle position sensor which senses the state of engagement of the clutch packs, i.e. first clutch pack engaged, second clutch pack disengaged; first clutch pack disengaged, second clutch pack engaged; neutral, with both clutch packs disengaged.

Preferably, the adjustment means allows the period of any one engagement/disengagement cycle to be adjusted between a minimum of 0.01 seconds and a maximum of 20 seconds, and more preferably between a minimum of 1 second and a maximum of 6 seconds.

The adjustment means may comprise a rotatable member, such as a potentiometer, and may further comprise means to rotate the said member, such as a knob, or a lever. Advantageously, rotation of the adjustment means increases or decreases the time period of the engagement and/or disengagement cycle of the first and/or second clutch packs, thereby increasing or decreasing the aggressiveness of clutch take up. More advantageously, rotation of the adjustment means in one direction decreases the time period of the engagement and/or disengagement cycle of the first and/or second clutch packs, thereby increasing the aggressiveness of clutch take up, and rotation in the other direction increases the time period of the engagement and/or disengagement cycle of the first and/or second clutch packs, thereby decreasing the aggressiveness of clutch take. Alternatively, the adjustment means may comprise a plurality of buttons, or keypads, wherein depressing one of the buttons or keypads decreases the time period of the engagement and/or disengagement cycle of the first and/or second clutch packs, and depressing another of the buttons or keypads increases the time period of the engagement and/or disengagement cycle of the first and/or second clutch packs.

Preferably, the control means comprises an electrical or electronic controller.

The means to engage and disengage the first and/or second clutch pack may comprise a source of pressurised fluid, and a valve block including a plurality of valves controlled by the control means, wherein upon receiving a signal from the control means a valve is opened or closed in accordance with an engagement/disengagement program cycle to supply or with hold pressurised fluid from one of the said clutch packs to engage or disengage the said clutch pack.

Preferably, the pressurised fluid is hydraulic fluid.

The clutch packs of the power shuttle may be of the pressure on type, where fluid pressure is applied to engage the clutch packs, and spring force is used to bring the clutch packs to their disengaged position when the fluid pressure is removed. Alternatively, the clutch packs may be of the pressure off type, where the clutch packs are engaged by spring force, and fluid pressure is applied to disengage the clutch packs.

BRIEF DESCRIPTION OF THE DRAWINGS

In the drawings, which illustrate a preferred embodiment of the invention.

DETAIL DESCRIPTION OF THE PREFERRED EMBODIMENTS

Figure 1:
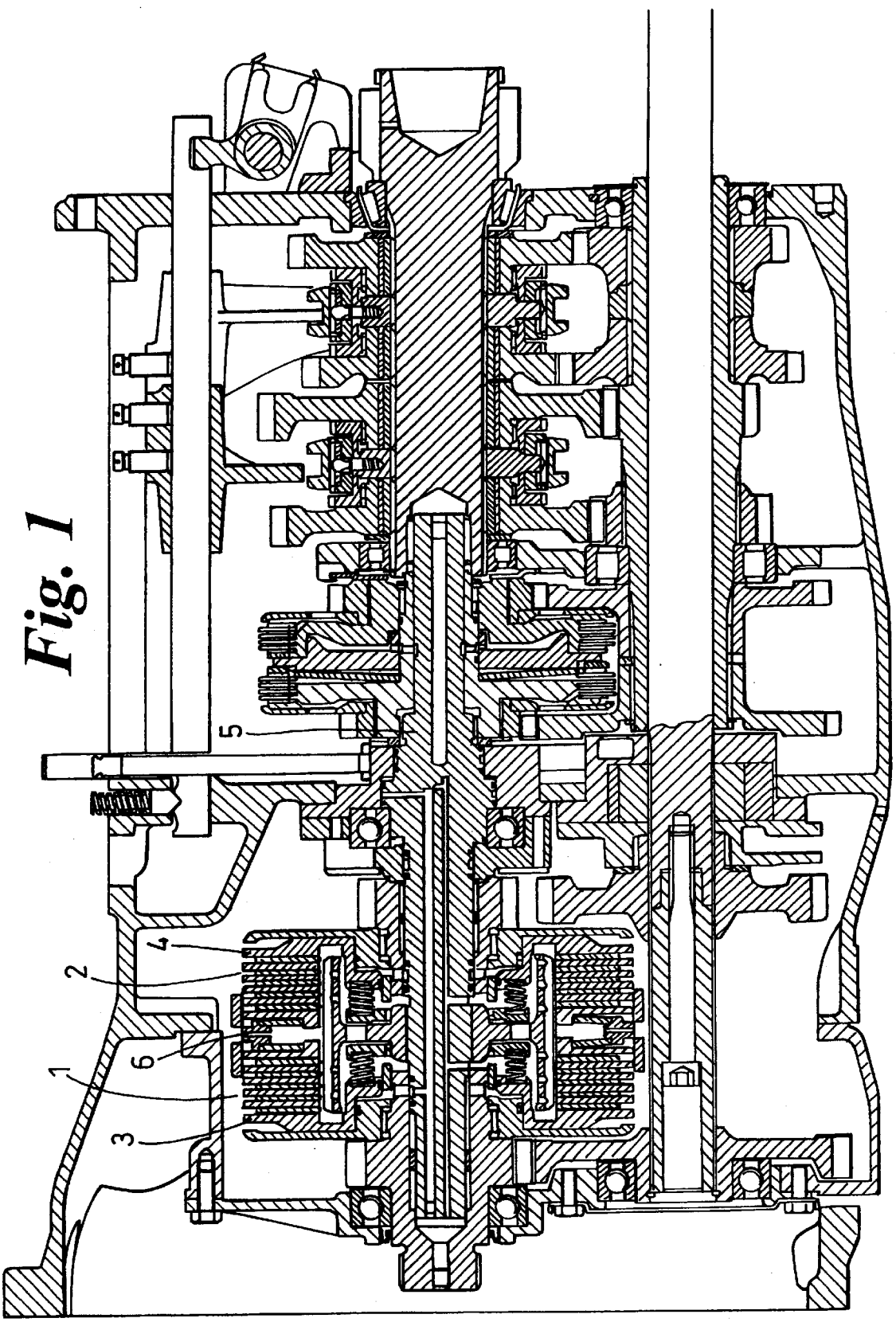
FIG. 1 is a cross-sectional elevation of a power shuttle transmission.

In the drawings FIG. 1 illustrates a power shuttle transmission comprising a pair of clutch packs 1, 2. The clutch packs provide three positions, namely neutral where neither of the clutch packs is engaged, forward where clutch pack 1 is engaged, but clutch pack 2 is disengaged, and reverse, where clutch pack 1 is disengaged, but clutch pack 2 is engaged. The clutch packs 1, 2 are engaged/disengaged by the introduction or removal of hydraulic fluid from the pistons 3, 4 respectively.

The invention relates specifically to controlling the introduction and/or removal of hydraulic fluid from the clutch packs to control the engagement/disengagement cycles of the power shuttle transmission.

The operation of the power shuttle transmission will not be described in greater detail since such transmissions, per se, are well known to those skilled in the art.

The aggressiveness with which drive is taken up by one of the clutch packs depends on how quickly hydraulic fluid is introduced to one of the respective clutch packs to actuate one of the respective pistons 3, 4. When shifting from driving the gear box input 5 in a first direction to driving the gearbox input 5 in a second direction, the aggressiveness with which drive in the second direction is taken up also depends on the time taken for drive to the second clutch pack is released.

Figure 2:
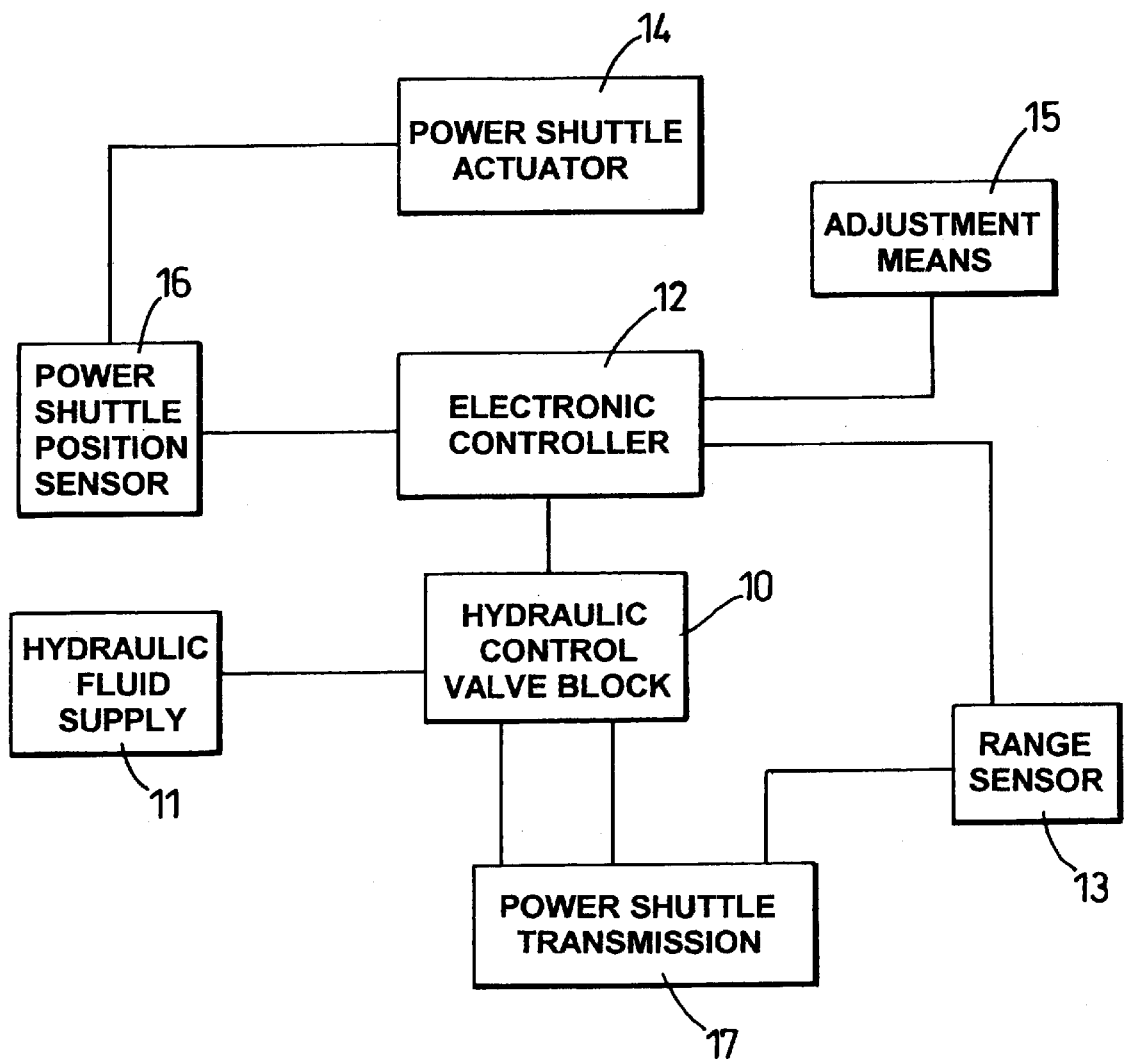
FIG. 2 is a block diagram of a control system according to the invention.

Referring now to FIG. 2, there is shown a block diagram illustrating the power shuttle control system of the invention. Hydraulic fluid flows from a source of pressurised hydraulic fluid 11 through a valve block 10 to the power shuttle transmission 17. The valve block 10 comprises a plurality of electrically operated valves. Opening one of the valves permits pressurised hydraulic fluid to flow to one of the pistons 3, 4 of the clutch packs 1, 2 to engage the same. Actuation of the valves is controlled by the electronic controller 12.

The inputs received by the electronic controller 12 include those from a range sensor 13, a shuttle actuator 14 which may comprise a switch, a power shuttle position sensor 16, and an adjustment means 15. The power shuttle position sensor detects the state of engagement of the clutch packs 1, 2 by sensing the position of the power shuttle actuator 14, which may comprise a lever mounted in the operator's cab. The sensor 16 may comprise three switches, each respective switch indicating one state of engagement of the clutch packs, and sending a signal to the electronic controller 12 accordingly. The controller 12 has a number of programs, and the clutch engagement/disengagement cycle depends on which particular program is selected. The program selected depends on the signal received from the range sensor 13, which senses the transmission range which the operator has selected at any given moment in time, and the signal received from the power shuttle position sensor 16.

The period of each program cycle can be varied by the adjustment means 15. The adjustment means is located in the vicinity of the tractor operator, for example, in the case of an agricultural tractor in the operator's cab, or platform. The adjustment means may comprise a potentiometer having a knob attached thereto, thereby allowing the position of the potentiometer to be adjusted. By adjusting the potentiometer the cycle of any one given program is accelerated or decelerated. The operator can therefore adjust the aggressiveness with which drive is taken up to suit the requirements of the task to be completed, or his own personal preferences.

Rather than using a potentiometer adjusted by means of a knob, the adjustment means may comprise a pair of buttons, actuation of one of the buttons increasing the aggressiveness of clutch take up, and actuation of the other button decreasing the aggressiveness of clutch take up. Other adjustment means may be used, for example a joystick or a toggle switch.

Figure 3:
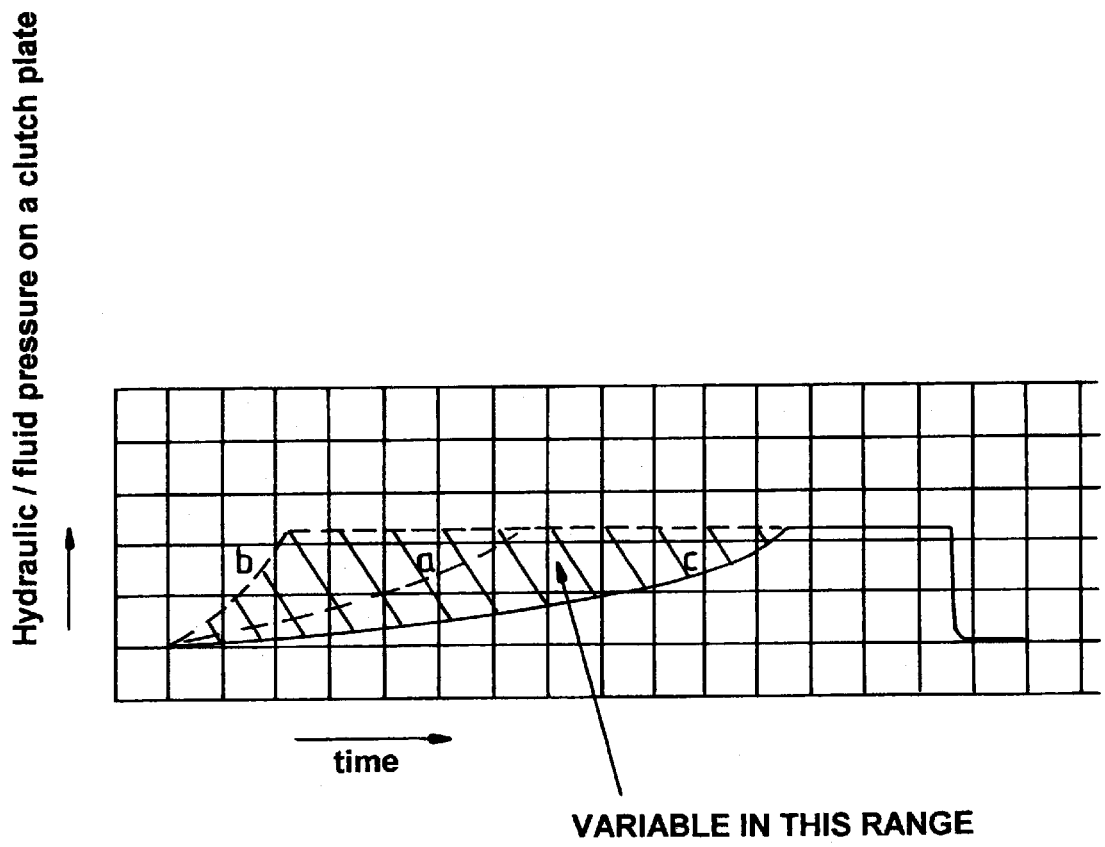
FIG. 3 is a graph showing hydraulic pressure versus time for a neutral to engaged to neutral cycle.
Figure 4:
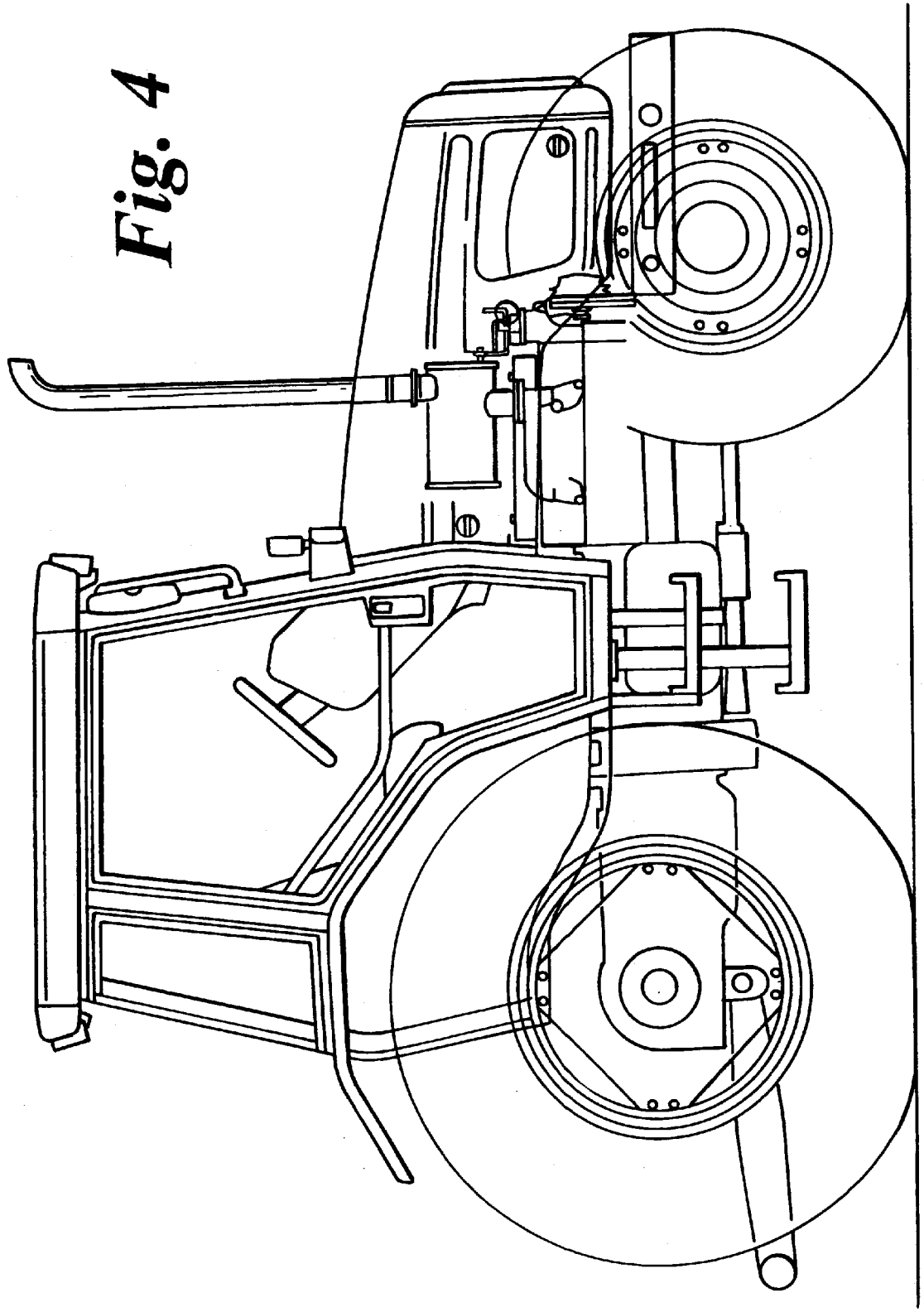
FIG. 4 is a side view of a tractor comprising a power shuttle transmission and a control system according to the invention.

FIG. 3 the shaded area illustrates the range of variation of aggressiveness of clutch take up. Plot "a" shows a typical take up curve. Plot "b" illustrates a more aggressive clutch take up curve, the clutch being engaged in less than half the time taken in plot "a". Plot "c" illustrates a less aggressive clutch take up curve, the time taken to fully engage the clutch being approximately double the length of tie taken in plot "a".

The invention is particularly advantageous because it allows a comparatively uncomplicated transmission and controller to be customised by the operator to the requirements of a variety of tasks, each having different demands on the power shuttle transmission, and furthermore the operator may adjust the transmission to suit his own requirements. Recent developments in transmissions have focussed on taking decision making away from the operator by using more complex control apparatus and programs. The present invention provides a transmission which gives decision making back to the operator, provides a more flexible machine, and is relatively uncomplicated.

What we claim is:

1. A control system for a power shuttle transmission, the transmission comprising a first clutch pack, engagement of which drives a transmission output in a first direction, and a second clutch pack, engagement of which drives the transmission output in a second direction, and means to engage and disengage the clutch packs, wherein the clutch packs are engaged and disengaged through engagement and disengagement cycles, and wherein the control system comprises control means to initiate and complete the engagement and disengagement cycles of the clutch packs, and wherein the control system comprises adjustment means for actuation by an operator of the transmission to adjust the duration of any one of the engagement/disengagement cycles.

2. A control system according to claim 1, wherein the control means comprises a gear sensor means to sense an engaged gear ratio in the transmission.

3. A control system according to claim 1, wherein the transmission comprises a plurality of gear sets each comprising a plurality of engageable gear ratios.

4. A control system according to claim 3, wherein the gear sensor means is arranged to sense the engaged gear ratio in one of the said gear sets.

5. A control system according to claim 1, wherein the control means is programmed with a plurality of different program cycles for initiating and completing engagement/disengagement cycles of the clutch packs.

6. A control system according to claim 1, wherein the control means comprises a shuttle position sensor, which senses the state of engagement of the clutch packs.

7. A control system according to claim 1, wherein the adjustment means allows the period of any one engagement/disengagement cycle to be adjusted between a minimum of 0.01 seconds and a maximum of 20 seconds.

8. A control system according to claim 7, wherein the adjustment means allows the period of any one engagement/disengagement cycle to be adjusted between a minimum of 1 second and a maximum of 6 seconds.

9. A control system according to claim 1, wherein the adjustment means comprises a rotatable member, and wherein rotation of the adjustment means adjusts the time period of the engagement and disengagement cycle of the clutch packs, thereby adjusting the aggressiveness of clutch take up.

10. A control system according to claim 1, wherein the adjustment means comprises a plurality of depressible members, and wherein depressing one of the said members decreases the time period of the engagement and disengagement cycle of the clutch packs, and depressing another of the said members increases the time period of the engagement and disengagement cycle of the clutch packs.

11. A control system according to claim 1, wherein the control means comprises an electrical or electronic controller.

12. A control system according to claim 1, wherein the means to engage and disengage the clutch packs comprises a source of pressurised fluid, and a valve block including a plurality of valves controlled by the control means, wherein upon receiving a signal from the control means a valve is opened or closed in accordance with an engagement/disengagement program cycle to supply or with hold pressurised fluid from one of the said clutch packs to engage or disengage the said clutch pack.

13. A tractor comprising a power shuttle transmission and a control system for the said power shuttle transmission, wherein the transmission comprising a first clutch pack, engagement of which drives a transmission output in a first direction, and a second clutch pack, engagement of which drives the transmission output in a second direction, and means to engage and disengage the clutch packs, wherein the clutch packs are engaged and disengaged through engagement and disengagement cycles, and wherein the control system comprises control means to initiate and complete the engagement and disengagement cycles of the clutch packs, and wherein the control system comprises adjustment means for actuation by an operator of the transmission to adjust the duration of any one of the engagement/disengagement cycles.

* * * * *